(12) United States Patent
Di Giulio

(10) Patent No.: US 8,201,177 B2
(45) Date of Patent: Jun. 12, 2012

(54) SCHEDULING A WORKLOAD BASED ON WORKLOAD-RELATED VARIABLES AND TRIGGERING VALUES

(75) Inventor: Domenico Di Giulio, Rome (IT)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 12/257,680

(22) Filed: Oct. 24, 2008

(65) Prior Publication Data

US 2009/0133024 A1 May 21, 2009

(30) Foreign Application Priority Data

Nov. 19, 2007 (EP) .................................... 07120997

(51) Int. Cl.
*G06F 9/46* (2006.01)
(52) U.S. Cl. ........................................ 718/102
(58) Field of Classification Search .................. 718/102
See application file for complete search history.

(56) References Cited

U.S. PATENT DOCUMENTS

| 6,779,183 | B1 | 8/2004 | Chekuri et al. | |
|---|---|---|---|---|
| 7,379,888 | B1* | 5/2008 | Mahapatro | 705/7.13 |
| 2003/0018680 | A1* | 1/2003 | Iglesias et al. | 709/100 |
| 2004/0103414 | A1* | 5/2004 | VomLehn et al. | 718/102 |
| 2008/0066072 | A1* | 3/2008 | Yurekli et al. | 718/104 |
| 2009/0320034 | A1* | 12/2009 | Tsunoda et al. | 718/103 |

OTHER PUBLICATIONS

Barbosa Da Silva, Fabricio A. et al., "Simulation-based average case analysis for parallel job scheduling", IEEE, http://ieeexplore.ieee.org/Xplore/login.jsp?url=/iel5/7348/19928/00922110.pdf, 2001, pp. 15-24.
Khoo, B.T. B. et al., "A multi-dimensional scheduling scheme in a Grid computing environment", Journal of Parallel and Distributed Computing, vol. 67, Issue 6, http://portal.acm.org/citation.cfm?id=1243355, Jun. 2007, Abstract, 2 pages.
Rodriguez, Fernando et al., "A Multiple Dimension Slotting Approach for Virtualized Resource Management", Proceedings of the 1st Workshop on System-level Virtualization for High Performance Computing ({HPCVirt}) 2007, in conjunction with the 2nd {ACM} {SIGOPS} European Conference on Computer Systems ({EuroSys}) 2007, http://www.csm.ornl.gov/srt/hpcvirt07/papers/HPCVirt07-RodFreNav.pdf, 7 pages.

* cited by examiner

*Primary Examiner* — Idriss N Alrobaye
(74) *Attorney, Agent, or Firm* — Stephen J. Walder, Jr.; Jeffrey S. LaBaw

(57) ABSTRACT

A mechanism is provided for scheduling a workload on a computer. The mechanism receives, in the computer, one or more workload-related variables. The mechanism further receives, in the computer, one or more trigger values for at least one of the one or more workload-related variables. Moreover, the mechanism determines, from the workload-related variables and their triggering values, one or more conditions under which one or more tasks are to be performed on the computer. In addition, the mechanism acquires a status value of at least one of the one or more workload-related variables at regular intervals and performs a task when a status value of a workload-related variable attains the triggering value for the task.

14 Claims, 4 Drawing Sheets

SCHEDULING A WORKLOAD BASED ON WORKLOAD-RELATED VARIABLES AND TRIGGERING VALUES

TECHNICAL FIELD

The present invention relates to a method, system and computer program for scheduling a workload on a computer or a network comprising a plurality of computers.

BACKGROUND

Workload scheduling is an increasingly important component of an IT environment. Indeed, many grid computing environments are driven by the scheduling of work across a distributed set of resources (e.g. computation, storage, communication capacity, software licenses, special equipment etc.). Workload scheduling systems typically comprise a means for scheduling a complex set of automated tasks on the machines of an IT infrastructure and making sure that each task is executed on time and only when a given dependency or prerequisite condition is met. In order to do that, some workload scheduling systems allow the definition of tasks to be executed together with a set of rules to be met for creating an execution plan. To this end, the workload scheduling system elaborates the rules, considering time dependencies and any other constraint, and builds a plan whose execution is monitored by the user.

Many simple workload scheduling systems use time as a primary driver for the scheduling of tasks. In other words, in these workload scheduling systems, tasks are defined to run on a primarily periodic basis (subject to other pre-requisite conditions being met). In order for tasks to be run when particular events happen (regardless of the time at which these events happen), commercial workload scheduling systems often include an "event-management" feature which allows the definition of rules that are triggerable by defined events (to perform defined tasks). However, prior art workload-scheduling systems are essentially uni-variate in nature, i.e. varying with respect to only one parameter. Simple workload scheduling systems use time as a primary driver, i.e. single variant, and commercial workload scheduling systems include "event management" as a kind of "add-on" that allows workload scheduling on an event-driven basis, regardless of time.

SUMMARY OF THE INVENTION

In one illustrative embodiment, a method is provided for scheduling a workload on a computer. The method comprises receiving, in the computer, one or more workload-related variables. The method further comprises receiving, in the computer, one or more trigger values for at least one of the one or more workload-related variables. Moreover, the method comprises determining, from the workload-related variables and their triggering values, one or more conditions under which one or more tasks are to be performed on the computer. In addition, the method comprises acquiring a status value of at least one of the one or more workload-related variables at regular intervals and performing a task when a status value of a workload-related variable attains the triggering value for the task.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Further to the discussion above, time is not the only dimension to be considered when scheduling a workload on a set of machines since, in addition to tasks that must be run periodically, other tasks exist that must only be run when defined conditions occur. Traditional workload scheduling systems often solve this problem by including an "event-based" scheduling facility. These facilities typically require the definition of "event-based" scheduling rules to trigger the execution of tasks when selected events are detected. However, the scheduling capabilities of event-based scheduling rules are often very limited compared with time-based scheduling rules. Furthermore, event-based schedulers often appear as a sort of "add-on" feature on top of time-based schedulers. The time-based schedulers maintain a separate existence from the event-based schedulers and are managed through separate editing and reporting systems to those of the event-based schedulers.

The illustrative embodiment herein provides a comprehensive solution for scheduling events in time and other dimensions, such events being usually managed through "event-based scheduling." Accordingly, in the illustrative embodiment, a "dimension" is broadly considered to be a field that could be defined by any of the following:

a numeric value (e.g., the amount of free space (KBs) in a machine's hard drive system);

a discrete value (e.g., the fingerprint of users that have access to an application server); or a textual value (e.g., the names of files in a machine's file system folder). Indeed, any variable can be considered as a dimension for the illustrative embodiment, provided that the values of the variable can be ordered in accordance with a predefined protocol.

Figure 1:
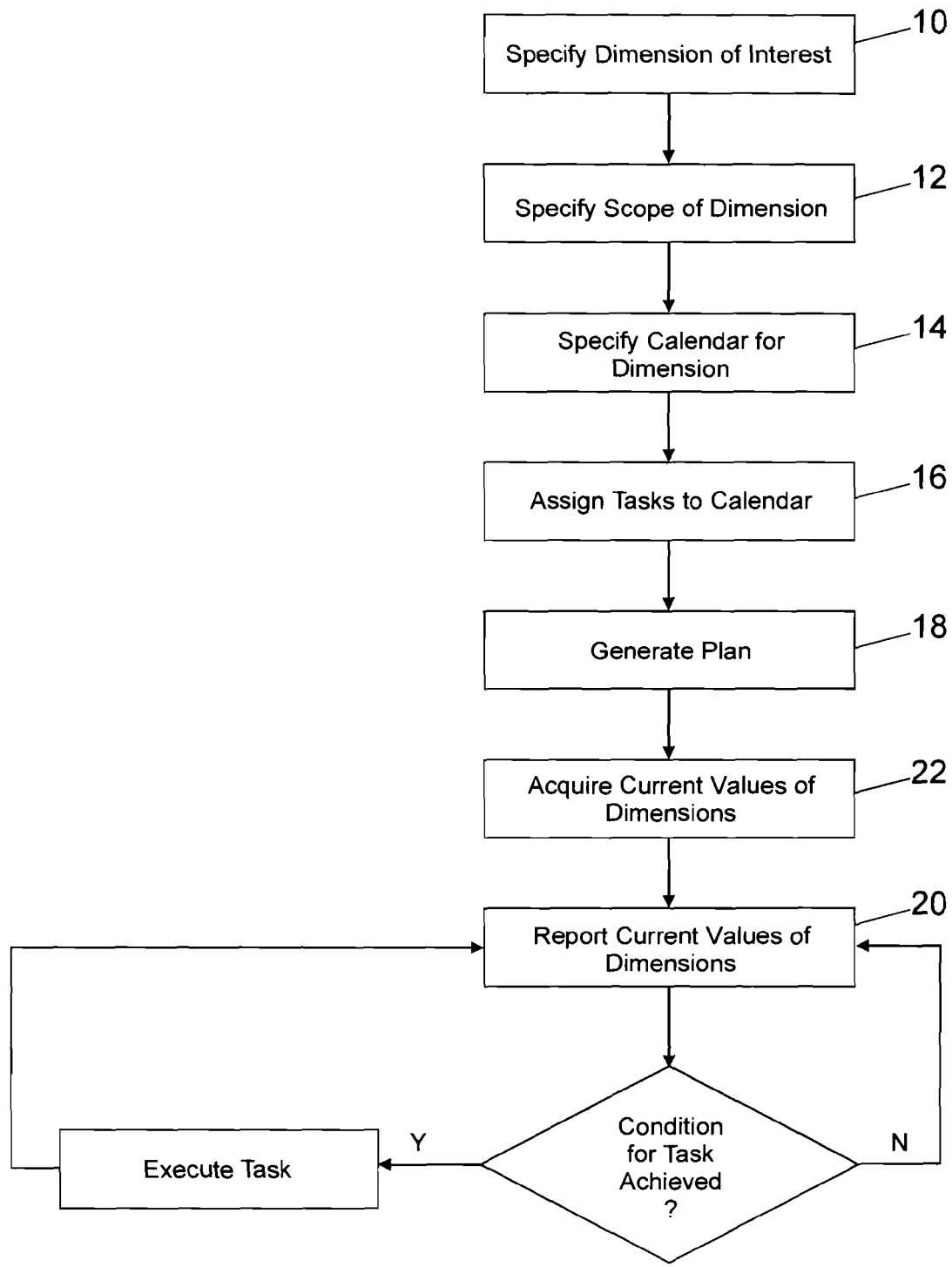
FIG. 1 is an example flow-chart of the operation of the one illustrative embodiment.

Accordingly, referring to FIG. 1, the illustrative embodiment enables users to specify (step 10) a plurality of custom dimensions by supplying the following:

a field type (e.g., numeric, text, discrete, etc.);

a set of allowed values (e.g., start/end limits for numeric dimensions, allowed values for discrete dimensions, etc.); and criteria for ordering the allowed values.

In addition, the illustrative embodiment allows a user to specify (step 12) the scope of a dimension as being local or global. A dimension of local scope is only applicable to selected machines in a scheduling network. In contrast, a dimension of global scope, is applicable to all of the network. On defining the scope of a dimension as being local, a user must provide a data acquisition means (e.g., a script), which is executable on the machines specified by the user, to acquire the current value of the local dimension at any time. This enables agents (normally used by scheduling systems to execute tasks on target machines) to take snapshots of the current value of each dimension at regular intervals. The illustrative embodiment acquires data regarding dimensions of global scope by defined machines, polled by other machines, to get current values of the dimensions.

Having specified the dimensions to be used in the illustrative embodiment, the illustrative embodiment enables a user to specify (step 14) a calendar for each dimension and assign (step 16) tasks to the calendar. The calendar contains values relevant to the specified dimension, in the same way that a time-based scheduler (i.e. a scheduler using time as its driver dimension) uses a calendar comprising activating dates/times etc.

Take for example, a task comprising the backing-up of a database when its table space reaches 10 MB, 20 MB or 75 MB in size. The task may be included in the preferred embodiment by defining a calendar on the dimension "table space size" including only the values 10 MB, 20 MB and 75 MB (just as a calendar defined on the time dimension includes only a list of selected days).

More generally, all of the complex rules typically used in calendar-based scheduling are applicable to the dimensions chosen by the user. Instead of requiring a user to manually enter values for the calendar for a dimension, the illustrative embodiment also provides an automated facility for the generation of values by generating rules, in a similar manner as in the time domain. For instance, in the time domain a generating rule could be "every friday", while in the domain of disk space a generating rule may be "every 100 MBs."

From this information, the illustrative embodiment generates (step 18) a plan which includes a list of task instances to be executed for every dimension. The plan specifies the conditions under which each task instance will run (according to the meaning of the dimension on which the task is scheduled). Thus, unlike traditional "event-based" workload schedulers, in the illustrative embodiment, task instances can be planned in advance, and trial/forecast plans can be created on every dimension (just as it would normally be done in the time domain).

Furthermore, while task scheduling is done separately for each of the different dimensions, the illustrative embodiment comprises reporting capabilities that can be activated to display (step 20) the status of jobs with respect to the multiple dimensions defined by the user. This is made possible, by the previously mentioned data acquisition systems of the illustrative embodiment, which acquire (step 22) the current values of all the dimensions (i.e. not just the value of the dimension which establishes the condition under which the tasks have been scheduled to run). From this information, a task instance can be specified as occupying a place in the multi-dimensional space formed by the user-defined dimensions.

Figure 2:
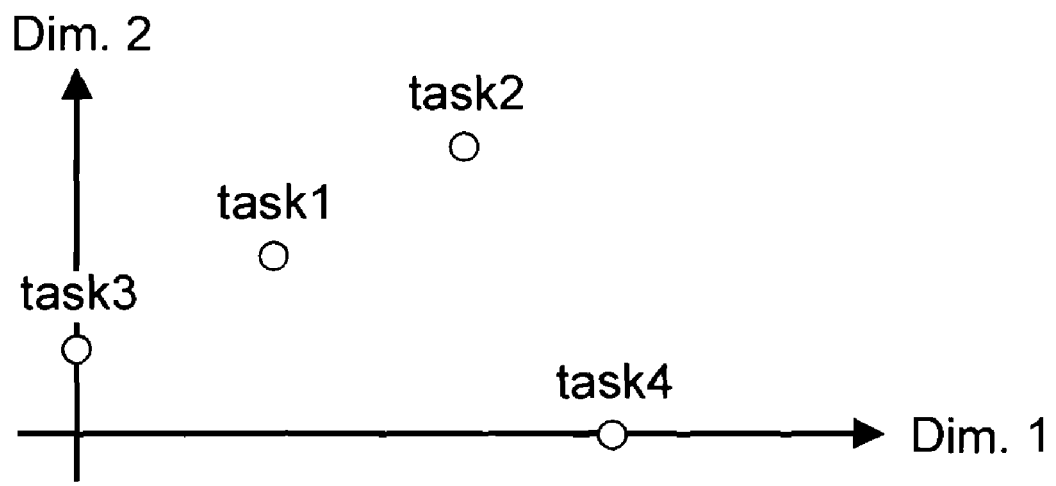
FIG. 2 is an example graph of the status of a plurality of jobs with respect to two dimensions defined in one illustrative embodiment.
Figure 3:
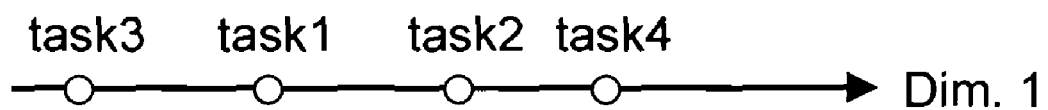
FIG. 3 is an example diagram of the projection of the jobs in FIG. 2 onto one of the dimensions in FIG. 2.

Referring to FIG. 2, four task instances ($task_1$, $task_2$, $task_3$ and $task_4$) are shown. Each task instance is located at the point in multi-dimensional space where the task was run. Of course, where the number of defined dimensions is greater than two or three, it is not possible to show task instances on a graph detailing all of the dimensions. Instead, a projection of the task instances onto one or more selected dimensions is feasible, as shown in the example of FIG. 3. For example, the task instances of FIG. 2 are projected onto a dimension Dim.1.

A benefit of multi-dimensional reporting (which is not provided by normal "event-based scheduling") is the ability to show correlated dimensions in the same graph so that users can be made aware of when tasks are run with respect to all of these dimensions. For example, when executing a database backup (dimension "table space size"), the current value of the following dimensions may be of interest for the user and shown in reports:

Time;

Amount of free space left on the backup application server; and

Number of open transactions on the database.

The illustrative embodiment is also extendable to enable multiple calendars to be assigned to every task (with for example, a calendar for each dimension). This extends task instances to be scheduled to run only in appropriate points of the multi-dimensional space. In other words, multivariable triggering conditions may be defined for the tasks. However, increasing the number of variables in the triggering conditions may make it harder for a task instance to achieve the multi-dimensional point at which the task is supposed to run. To address this issue, ranges may be defined in calendars instead of exact values for the triggering conditions.

Figure 4:
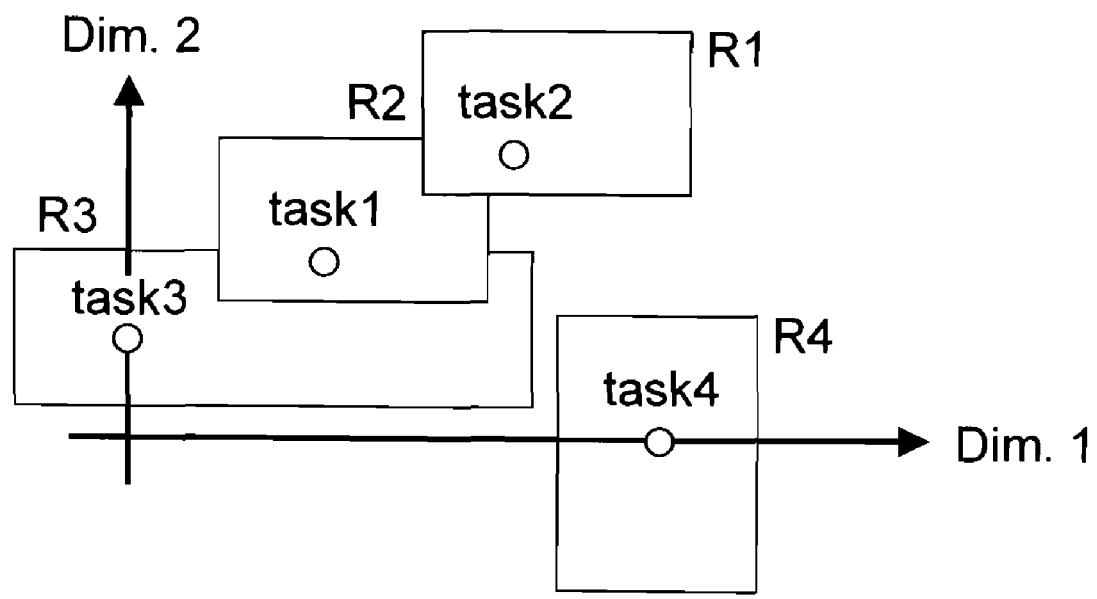
FIG. 4 is an example graph showing the regional clustering of the tasks of FIG. 2 with respect to the two dimensions in FIG. 2.

Referring to FIG. 4, for example, a task instance may be run on entering a relevant region ($R_1$, $R_2$, $R_3$ and $R_4$) of the multi-dimensional rectangle (defined by ranges selected in the assigned calendars). In support of this extension, the reporting facility of the illustrative embodiment may be extended to show the relevant regions around the specific execution points for the task instances (as shown in FIG. 4).

Figure 5:
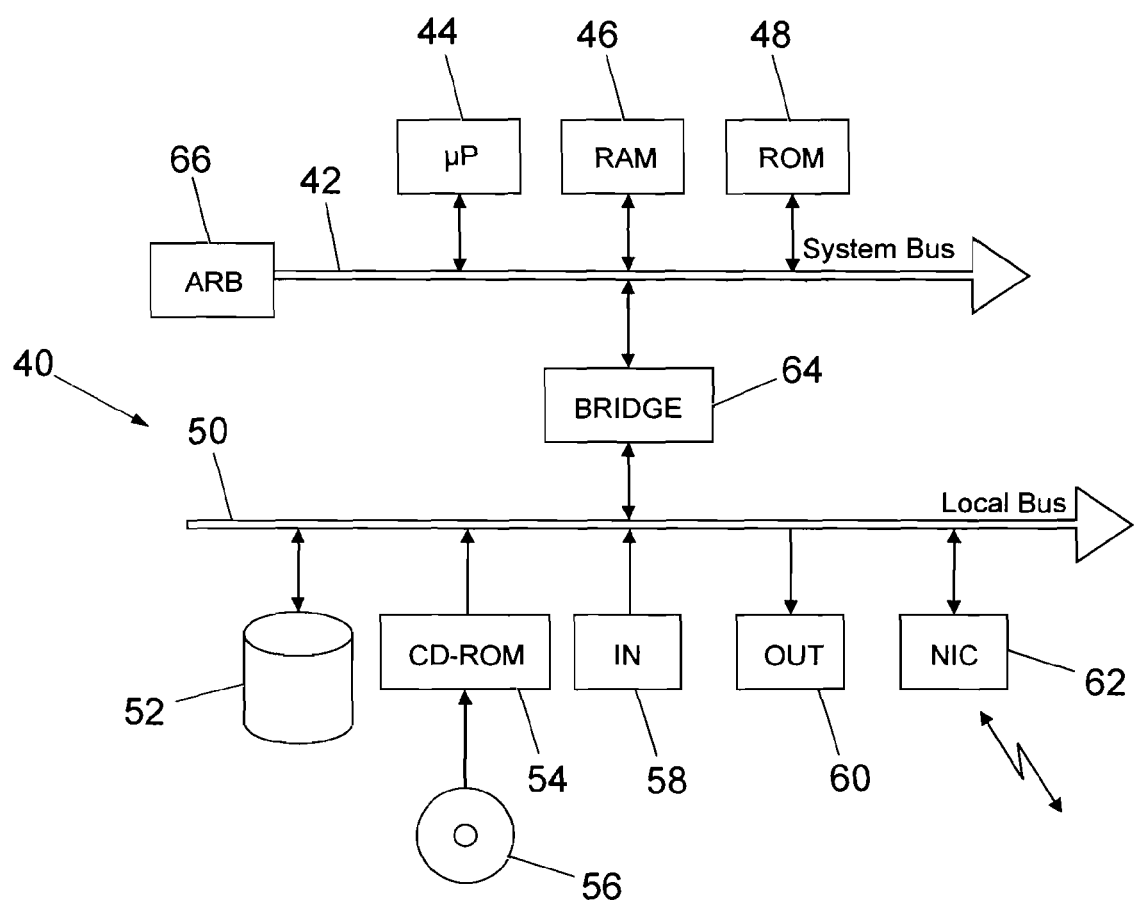
FIG. 5 is an example block diagram of a computer on which one illustrative embodiment operates.

A computer on which the illustrative embodiment operates has a generic structure shown in FIG. 5. More particularly, a generic computer of the system is denoted with reference numeral 40. The computer 40 is formed by several units that are connected in parallel to a system bus 42. In detail, one or more microprocessors 44 control operation of the computer 40. A RAM 46 is directly used as a working memory by the microprocessors 44 and a ROM 48 stores basic code for a bootstrap of the computer 40. Peripheral units are clustered around a local bus 50 (by means of respective interfaces). Particularly, a mass memory consists of a hard-disk 52 and a drive 54 for reading CD-ROMs 56. Moreover, the computer 40 includes input devices 58 (for example, a keyboard and a mouse), and output devices 60 (for example, a monitor and a printer). A Network Interface Card (NIC) 62 is used to connect the computer 40 to the network. A bridge unit 64 interfaces the system bus 42 with the local bus 50. Each microprocessor 44 and the bridge unit 64 can operate as master agents requesting an access to the system bus 42 for transmitting information. An arbiter 66 manages the granting of the access with mutual exclusion to the system bus 42.

Alterations and modifications may be made to the above without departing from the scope of the invention.

The invention claimed is:

1. A method of scheduling a workload on a computer, the method comprising:
 receiving, in the computer, one or more workload-related variables, wherein the workload-related variables are dimensions for scheduling tasks;
 receiving, in the computer, one or more trigger values for a workload-related variable of the one or more workload-related variables;
 determining, from the workload-related variable and its associated triggering value, one or more conditions under which one or more tasks are to be performed on the computer;
 acquiring a status value of the workload-related variable at regular intervals;
 performing a task when the status value of the workload-related variable attains the triggering value for the task; and
 displaying the status value of the workload-related variable to a user within a diagram defined with reference to the one or more work-related variables, wherein:
 receiving the one or more trigger values for the workload-related variable comprises receiving a range of values for at least one of the one or more workload-related variables, within which a task will be triggered; and
 displaying the status value of the workload-related variable to the user comprises displaying the status value together with the range of values.

2. The method as claimed in claim 1, wherein receiving the one or more trigger values for the workload-related variable comprises receiving one trigger value for each of the one or more workload-related variables.

3. The method as claimed in claim 1, wherein receiving the one or more trigger values for the workload-related variable comprises receiving a plurality of trigger values for each of the one or more workload-related variables.

4. The method as claimed in claim 1, wherein receiving the one or more trigger values for the workload-related variable is replaced with receiving one or more generating rules to create one or more trigger values for at least one of the one or more workload-related variables.

5. The method of claim 1, wherein:
 the method further comprises executing the receiving, determining, acquiring, and performing operations on a plurality of computers in a network; and
 receiving the one or more of the workload-related variables comprises receiving user input specifying whether at least one of the one or more workload-related variables is applicable to some or all of the plurality of computers in the network.

6. A method of scheduling a workload on a computer, the method comprising:
 receiving, in the computer, one or more workload-related variables, wherein the workload-related variables are dimensions for scheduling tasks;
 receiving, in the computer, one or more trigger values for a workload-related variable of the one or more workload-related variables;
 determining, from the workload-related variable and its associated triggering value, one or more conditions under which one or more tasks are to be performed on the computer;
 acquiring a status value of the workload-related variable at regular intervals; and
 performing a task when the status value of the workload-related variable attains the triggering value for the task, wherein:
 the method further comprises executing the receiving, determining, acquiring, and performing operations on a plurality of computers in a network,
 receiving the one or more of the workload-related variables comprises receiving user input specifying whether at least one of the one or more workload-related variables is applicable to some or all of the plurality of computers in the network, and acquiring the status value of the workload-related variable comprises:
 using one or more task-executing means to determine the status value of the workload-related variable, in the event the user has specified that the workload-related variable is applicable to only some of the plurality of computers; and
 using one or more of the computers to poll one or more other computers in the network to acquire the status value of the workload-related variable, in the event the user has specified that the workload-related variable is applicable to all of the plurality of computers.

7. A system for scheduling a workload on a computer, the system comprising:
 a processor; and
 a memory coupled to the processor, wherein the memory comprises instructions which, when executed by the processor, causes the processor to:
 receive one or more workload-related variables, wherein the workload-related variables are dimensions for scheduling tasks;
 receive one or more trigger values for at least one of the one or more workload-related variables;
 determine, from the workload-related variables and their triggering values, one or more conditions under which one or more tasks are to be performed on the computer;
 acquire a status value of at least one of the one or more workload-related variables at regular intervals;
 perform a task when a status value of a workload-related variable attains the triggering value for the task; and
 display one or more status values of the at least one of the one or more workload-related variables to a user within a diagram defined with reference to the one or more work-related variables, wherein:
 receiving the one or more trigger values for at least one of the one or more workload-related variables comprises receiving a range of values for at least one of the one or more workload-related variables, within which a task will be triggered; and
 displaying the one or more status values of the at least one of the one or more workload-related variables to the user comprises displaying the one or more status values together with the range of values.

8. The system of claim 7, wherein the instructions cause the processor to receive the one or more trigger values for the at least one of the one or more workload-related variables by receiving one trigger value for each of the one or more workload-related variables.

9. The system of claim 7, wherein the instructions cause the processor to receive the one or more trigger values for the at least one of the one or more workload-related variables by receiving a plurality of trigger values for each of the one or more workload-related variables.

10. The system of claim 7, wherein the instructions cause the processor to replace the operation of receiving the one or more trigger values for the at least one of the one or more workload-related variables with receiving one or more generating rules to create a one or more trigger values for at least one of the one or more workload-related variables.

11. A computer program product stored on a non-transitory medium readable by a computer, the computer program product tangibly embodying a computer program for scheduling a workload on the computer, the computer program causing the computer to:

receive one or more workload-related variables, wherein the workload-related variables are dimensions for scheduling tasks;

receive one or more trigger values for at least one of the one or more workload-related variables;

determine, from the workload-related variables and their triggering values, one or more conditions under which one or more tasks are to be performed on the computer;

acquire a status value of at least one of the one or more workload-related variables at regular intervals;

perform a task when a status value of a workload-related variable attains the triggering value for the task; and display one or more status values of the at least one of the one or more workload-related variables to a user within a diagram defined with reference to the one or more work-related variables, wherein:

receiving the one or more trigger values for at least one of the one or more workload-related variables comprises receiving a range of values for at least one of the one or more workload-related variables, within which a task will be triggered; and displaying the one or more status values of the at least one of the one or more workload-related variables to the user comprises displaying the one or more status values together with the range of values.

12. The computer program product of claim 11, wherein the computer program causes the computer to receive the one or more trigger values for the at least one of the one or more workload-related variables by receiving one trigger value for each of the one or more workload-related variables.

13. The computer program product of claim 11, wherein the computer program causes the computer to receive the one or more trigger values for the at least one of the one or more workload-related variables by receiving a plurality of trigger values for each of the one or more workload-related variables.

14. The computer program product of claim 11, wherein the computer program causes the computer to replace the operation of receiving the one or more trigger values for the at least one of the one or more workload-related variables with receiving one or more generating rules to create a one or more trigger values for at least one of the one or more workload-related variables.

* * * * *